Sept. 10, 1968   H. O. WAGNER ET AL   3,400,619
DRIVE FOR THE FACE PLATE OF VERTICAL LATHES
Filed May 6, 1966   3 Sheets-Sheet 1

INVENTORS:
Hans O. Wagner
Alfred Jakob Zwicky
By

INVENTORS:
Hans O. Wagner
Alfred Jakob Zwicky
By
Walter Becker

Sept. 10, 1968  H. O. WAGNER ET AL  3,400,619
DRIVE FOR THE FACE PLATE OF VERTICAL LATHES
Filed May 6, 1966  3 Sheets-Sheet 3

INVENTORS:
Hans O. Wagner
Alfred Jakob Zwicky
By Walter Becker

United States Patent Office 3,400,619
Patented Sept. 10, 1968

3,400,619
DRIVE FOR THE FACE PLATE OF VERTICAL LATHES
Hans O. Wagner, Dusseldorf, Germany, and Alfred Jakob Zwicky, Rapperswil, Switzerland, assignors to Schiess Aktiengesellschaft, Dusseldorf, Germany
Filed May 6, 1966, Ser. No. 548,092
Claims priority, application Germany, May 15, 1965, Sch 37,063
5 Claims. (Cl. 82—28)

ABSTRACT OF THE DISCLOSURE

A variable speed drive means and mounting for the faceplate of a lathe. The drive means being hydraulic, infinitely variable and relatively shock-free.

---

The present invention relates to a drive for the face plate of vertical lathes. With heretofore known drives of this type, drives including an electric motor are employed which drive the face plate through a gear transmission the last gear of which meshes with a gear ring connected to the face plate. The starting and braking is in an ordinary manner electrically controlled while the coupling or clutch means for controlling the individual speed ranges between the electric motor and transmission or within the transmission must operate in a shock-free manner during the start and also when the tool engages the work piece for the first time.

The transmissions employed in heretofore drives of the above mentioned type are either multi-stage transmissions affording a plurality of velocity ranges, or are drives with an infinitely variable speed control. With these last mentioned drives, a direct current motor serves as drive motor in cooperation with a Leonard unit.

Both types of drives permitting a control by stages or an infinitely variable speed control are rather expensive in view of the transmission interposed between the face plate and the main motor or in view of the employment of the Leonard unit. Furthermore, a shock-free operation of the transmission during the start and during the first engagement of the tool with the work piece are assured only to a limited extent because the play in the gear transmission plays an important role as to the extent to which the interposed couplings or clutches absorb shocks and keep the same away from the face plate. Such shocks, however, would cause dynamic additional loads on the transmission and would result in an increased wear and a noisy operation.

The heretofore known infinitely variable drives in machine tools have the drawback that the control ranges are not sufficient to increase the speed range frequently required with a machine tool, without additional stage transmissions. In other words, it is not possible to operate the machine from the speed zero to the maximum speed without the provision of a stage transmission.

It is, therefore, an object of the present invention to provide a drive for the face plate of vertical lathes, which will overcome to above mentioned drawbacks.

It is another object of this invention to provide a drive for the face plate of vertical lathes, which will make superfluous the provision of an expensive stage transmission or the arrangement of a Leonard unit in combination with a stage transmission.

It is still another object of this invention to provide a drive as set forth in the preceding paragraph which will assure a shock-free starting movement of the face plate and will eliminate shockwise loads in the transmission as they might otherwise occur when the tool first engages the work piece.

Figure 1:
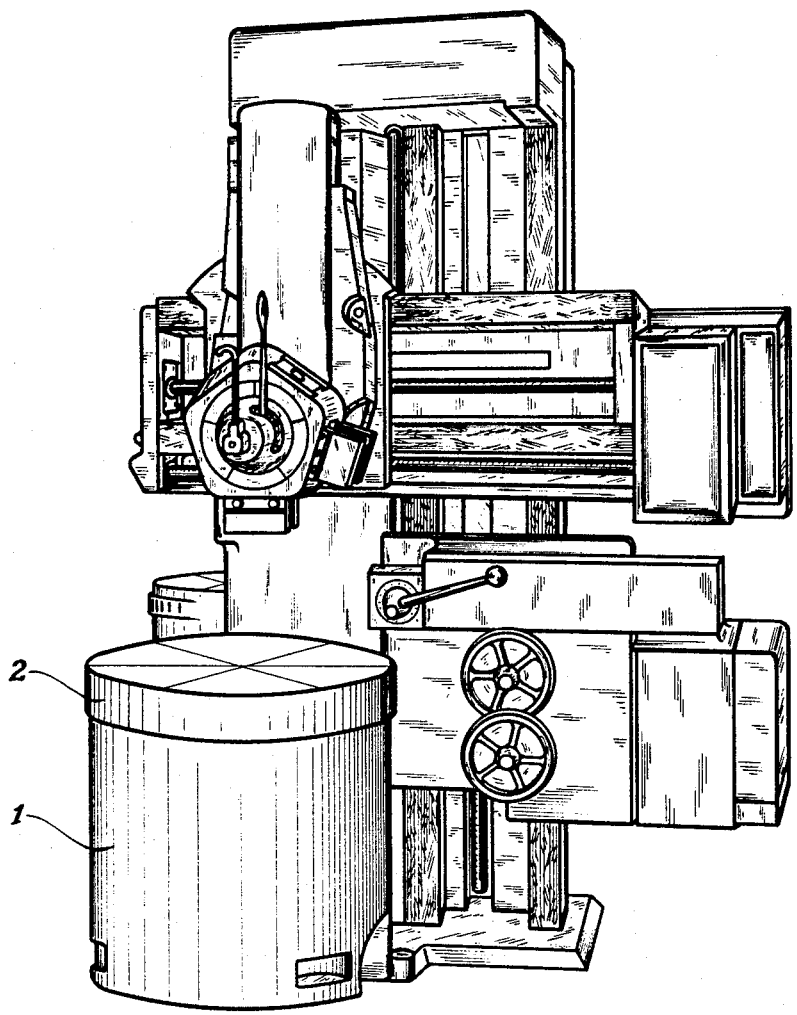

These and other objects and advantages of the invention will appear more clearly from the following specification in connection with the accompanying drawings, in which:

FIG. 1 is an isometric view of a one-stand vertical lathe with a hydraulic rotary piston engine as drive for the face plate.

Figure 2:
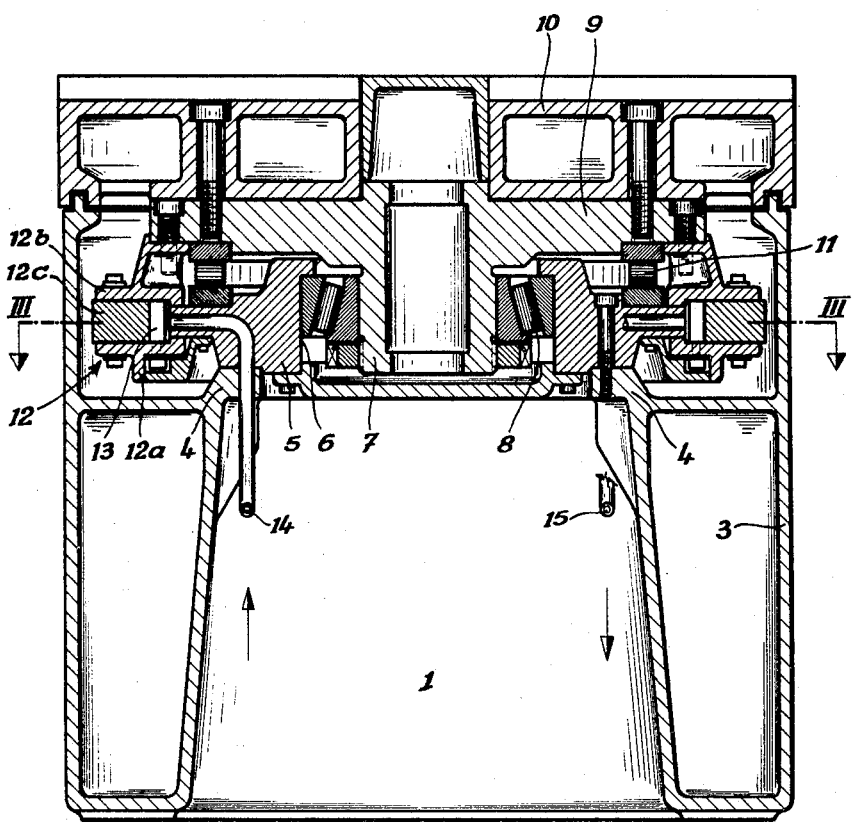

FIG. 2 diagrammatically illustrates a section through the lower machine portion with the face plate.

Figure 3A:
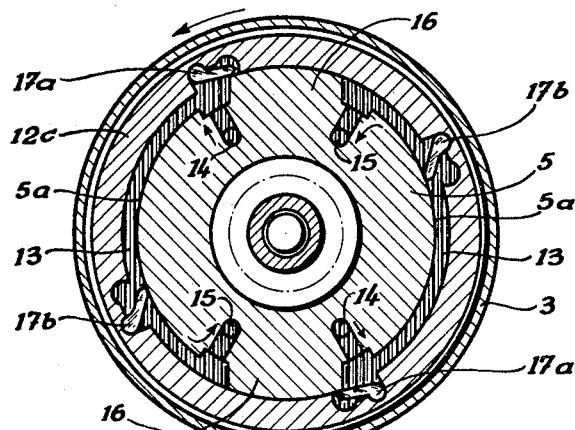
Figure 3B:
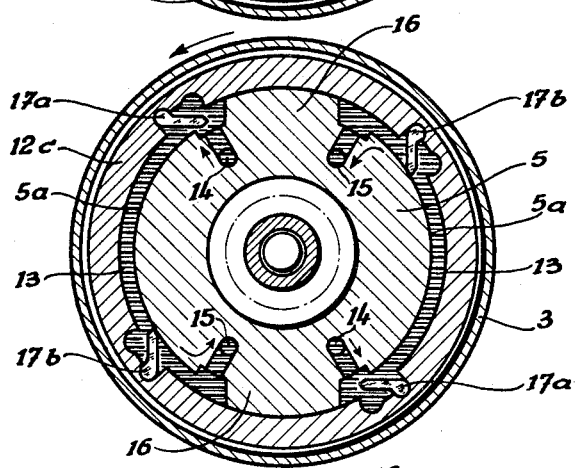
Figure 3C:
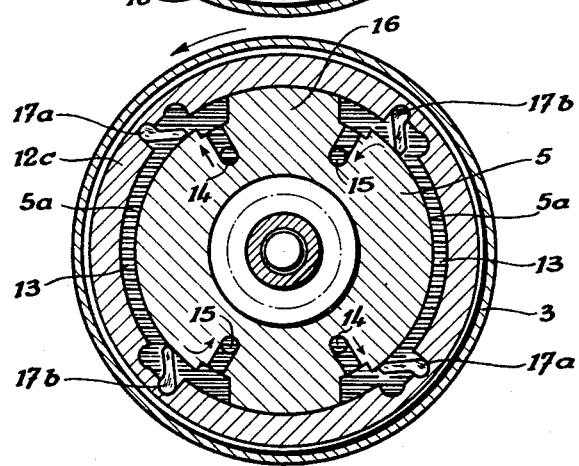

FIGS. 3a to 3c illustrate on a somewhat smaller scale than FIG. 2 sections along the line III—III of FIG. 2 through the hydraulic rotary piston machine showing various positions of the rotary piston housing as rotatable part with regard to the rotary piston as stationary part.

The above mentioned objects have been realized by the present invention which is characterized primarily by a hydraulic rotary piston machine the stationary part of which is stationarily connected to the lower part of the machine on which the face plate 2 is journalled while below the outer marginal portion of said face plate there is fixedly arranged the rotating part of the rotary piston machine which rotating part together with the stationary part defines the annular hollow chamber of the rotary piston machine.

According to a further development of the present invention, the stationary part of the rotary piston machine is in the form of a ring mounted on the lower part of the machine while the face plate is axially and radially supported by said ring. Such a design furnishes the possibility to produce the rotary piston machine independently of the face plate and of the lower portion of the machine and permits, following the completion of the rotary piston machine, to connect the rotating part, for instance the rotary piston machine housing, with the face plate, and also to mount the rotary piston as stationary part on the lower portion of the machine and to connect said rotary piston.

According to a further feature of the present invention, it is advantageous, for purposes of simplifying the construction, to feed the pressure fluid to said annular hollow chamber between the rotary piston housing and the rotary piston through the stationary part of the rotary piston machine and also to withdraw the fluid therefrom.

The drive according to the present invention is advantageous when the face plate is supported and journalled by anti-friction bearings and also when the face plate is journalled hydraulically. In this instance, there is realized the additional advantage that the pressure fluid for driving the rotary piston machine can at the same time be employed as pressure fluid for the hydrostatic journalling arrangement.

A further advantage is seen in the fact that by inserting a pressure relief valve between the pressure fluid pump and the rotary piston machine a safety factor will be obtained for the operation, which means a simple limitation to the maximum admissible torque.

In contrast to heretofore known drives which employ a pinion meshing from the outside with gear means on the face plate and exerting correspondingly high transverse forces upon the radial bearing for the face plate, the initiation of the driving torque symmetrically to the axis of rotation of the face plate in conformity with the present invention by employment of a rotary piston machine will avoid any radial load by outer driving forces.

Referring now to the drawing in detail, FIG. 1 illustrates an embodiment of a one-stand vertical lathe which purely from an outward appearance is not much different from lathes of the heretofore known type. The lathe illustrated in the drawing has been selected merely for purposes of illustration and it is to be noted that it could be replaced by any other vertical lathe, as for instance a two-stand vertical lathe, while the dimensions of the lathe are of no importance whatsoever as far as the invention is concerned. It will therefore suffice to limit the description of the invention to the description of the lower machine portion 1 and the face plate 2 rotatable thereon as well as to the face plate drive arranged below said face plate 2 and within the lower machine portion 1.

As will be evident from FIG. 2, within the outer wall 3 of the lower machine part generally designated 1 and more specifically by the rotary wall 4 there is supported the rotary piston 5 forming the stationary part of the rotary piston machine. In the inner bore 6 of the rotary piston 5 and through the intervention of an anti-friction bearing 8 there is radially supported the king pin 7 of the face plate 2. A part of the king pin 7 is formed by the face plate carrying flange 9 which supports the face plate body proper 10 in axial direction by means of an anti-friction bearing 11 arranged on the top side of the rotary piston 5. Around the rotary piston 5 there is provided the rotary piston housing 12 which forms the rotary part of the rotary piston machine and which extends above and below said rotary piston 5 in axial direction. The said rotary piston housing 12 comprises the lower ring member 12a and the upper ring member 12b and an intermediate ring member 12c therebetween. These rings are so composed, profiled and interconnected that the rotary piston 5 will be located therebetween in a sealing manner. Rotary piston 5 and rotary piston housing 12 define therebetween a hollow chamber 13 of circular cross section which in the particular embodiment illustrated in FIGS. 3a to 3c is interrupted by two radially protruding extensions 16 on the piston 5. These extensions 16 have their radial outer surface extending to the sealing surface of the intermediate ring 12c. Between each two radial extensions 16 of piston 5, pressure fluid flows in the annular chamber 13 which fluid is introduced into hollow chamber 13 directly at an extension 16 of piston 5 through said piston 5. The fluid is withdrawn directly at the next extension 16 through the rotary piston 5. FIG. 2 shows an inlet 14 at the left-hand side thereof and an outlet 15 at the right-hand side thereof.

It is, of course, to be understood that the pressure fluid circuit may have interposed therein control valves by means of which the pressure fluid flow can be varied for controlling the speed of the rotary piston machine and thereby of the face plate. Also standard devices for controlling the temperature of the pressure fluid may be employed.

The operation of the rotary piston machine and the passage of the pressure fluid through said machine are illustrated in FIGS. 3a to 3c. According to the embodiment illustrated in the drawing and as mentioned above, the rotary piston machine has a stationary rotary piston 5 which is provided with two radially directed extensions 16 which divide the annular hollow chamber 13 into two sections. It is, however, to be understood that the number of the radial extensions may also be greater than two so that the annular hollow chamber 13 will be sub-divided accordingly. The profiling of the inner surface of the intermediate ring 12c of piston housing 12 and the number of flaps 17a and 17b which are pivotally journalled in pockets of the intermediate ring 12c depends, of course, on the number of the extensions 16.

As mentioned above, the pressure fluid flows at one end of a section into the annular chamber 13 through piston 5 and flows out at the other end of the same section through piston 5.

According to the particular position shown in FIG. 3a, the rotary piston housing 12 occupies a position relative to piston 5 in which one flap 17a is located opposite to inlet 14. Flap 17a has been tilted outwardly so as to be able to slide past the radial extension 16. The pressure fluid entering through inlets 14 into sections 13 presses against the radially inwardly tilted flaps 17b and thus imparts a rotary movement upon the rotary piston housing 12. As a result thereof, housing 12 rotates together with face plate 2 and moves into the intermediate position according to FIG. 3b. The flaps 17a are then on their way to engage the sealing surface 5a of piston 5.

FIG. 3c shows flaps 17a engaging the sealing surface 5a of piston 5. They thus become working flaps inasmuch as now the inflowing pressure fluid presses against flaps 17a and brings about the further rotation of the rotary piston housing 12 with face plate 2. The pressure fluid between flaps 17a and 17b extending within the range 13 likewise rotates without function while at the same time the pressure fluid which is in front of the front flaps 17b is pressed out through outlet 15.

It will thus be seen that the rotary piston housing 12 uniformly rotates in conformity with the inflowing pressure fluid and also in conformity with the number of the individual sections of the annular chamber 13 the number of which depends on the number of the protrusions or extensions 16 of piston 5 and on the number of the inlets and outlets 14, 15.

As mentioned above, the rotary piston machine employed in conformity with the present invention permits an infinite control and assures a shock-free rotation in view of the hydraulic driving medium.

As will also be evident from FIG. 2, together with the rotary piston housing 12, face disc 2 rotates which is connected to housing 12 and comprises king pin 7, face plate flange 9 and face plate body 10. The speed depends on the quantity of pressure fluid passing through the rotary piston machine per time unit. The torque to be employed is dependent on the number of the radial extensions 16 of piston 5 and consequently on the size of the total surface acted upon by the pressure fluid for rotating the rotary piston housing 12.

As mentioned above, the drawing shows merely a specific embodiment of a vertical lathe and a specific embodiment of a hydraulic rotary piston machine. The design of the rotary piston 5, of the rotary piston housing 12, of flaps or gates 17a and 17b and of the control means for said flaps or gates, as well as the cross section of the annular chamber 13 may vary in conformity with the requirements. Also the employment of differently designed rotary piston machines is possible within the framework of the present invention.

It is, of course, to be understood that the present invention is, by no means, limited to the particular embodiment shown in the drawings but also comprises any modifications within the scope of the appended claims. Thus, for instance, instead of journalling the face plate in anti-friction bearings, it may also be journalled in a hydrostatic bearing.

What we claim is:

1. A turning machine comprising: a stationary base part, a face plate structure rotatably supported on said base part and including an upper workpiece portion and a lower disc on which said upper portion is mounted, and a hydraulic drive motor comprising relatively rotatable inner and outer parts, one of said motor parts being connected to said base part and being stationary, and the other one of said motor parts being connected to said face plate structure and being rotatable, said stationary motor part comprising a ring member fixed to said base, said disc being radially and axially journalled on said ring member.

2. A machine according to claim 1 in which said stationary motor part is a piston and said rotary motor part is a cylinder concentric with the piston, said piston and cylinder forming annular chamber means therebetween divided into motor compartments, and conduit means for supplying pressure fluid to and withdrawing fluid from said chambers.

3. A machine according to claim 2 in which said conduit means are in said piston.

4. In a vertical turning machine; a base, a first ring fixed on said base so as to expose the entire upper face thereof and the center and peripheral parts of the lower face thereof, the periphery of said first ring forming a piston, a second ring fitted about said first ring and forming annular motor chamber means therewith, third and fourth rings fixed to the top and bottom faces respectively of said second ring and slidably engaging the top and bottom sides respectively of said first ring near the periphery thereof, a disc having a shaft extending into the center of said first ring, a thrust bearing interposed between the bottom of said disc and the top of said first ring near the peripheral portion of said first ring, a radial and axial bearing inserted into the center of said first ring from beneath and engaging said shaft and said first ring, means clamping said radial and axial bearing to said shaft to hold said disc down on said thrust bearing, means connecting said disc at the periphery thereof with said fourth ring, and conduit means extending through said first ring for supplying fluid to and exhausting fluid from said motor chamber means.

5. A vertical turning machine according to claim 4 in which the periphery of said first ring comprises at least two uniformly circumferentially spaced radial extensions closely fitting inside said second ring so said motor chamber means are formed between said extensions, said second ring having vane means thereon sealingly engaging the periphery of the first ring and moveable on the second ring so as to ride over said projections, said conduit means opening into said motor chamber means near the opposite sides of said extensions.

References Cited
UNITED STATES PATENTS 2,098,214  11/1937  Benedek _____ 82—28 XR
2,699,695  1/1955   Addison _____ 82—2.4

LEONIDAS VLACHOS, *Primary Examiner.*